April 25, 1950     G. E. PETTY     2,505,064
RETRACTABLE ARRESTER GEAR FOR AIRCRAFT
Filed Feb. 18, 1948     4 Sheets-Sheet 1
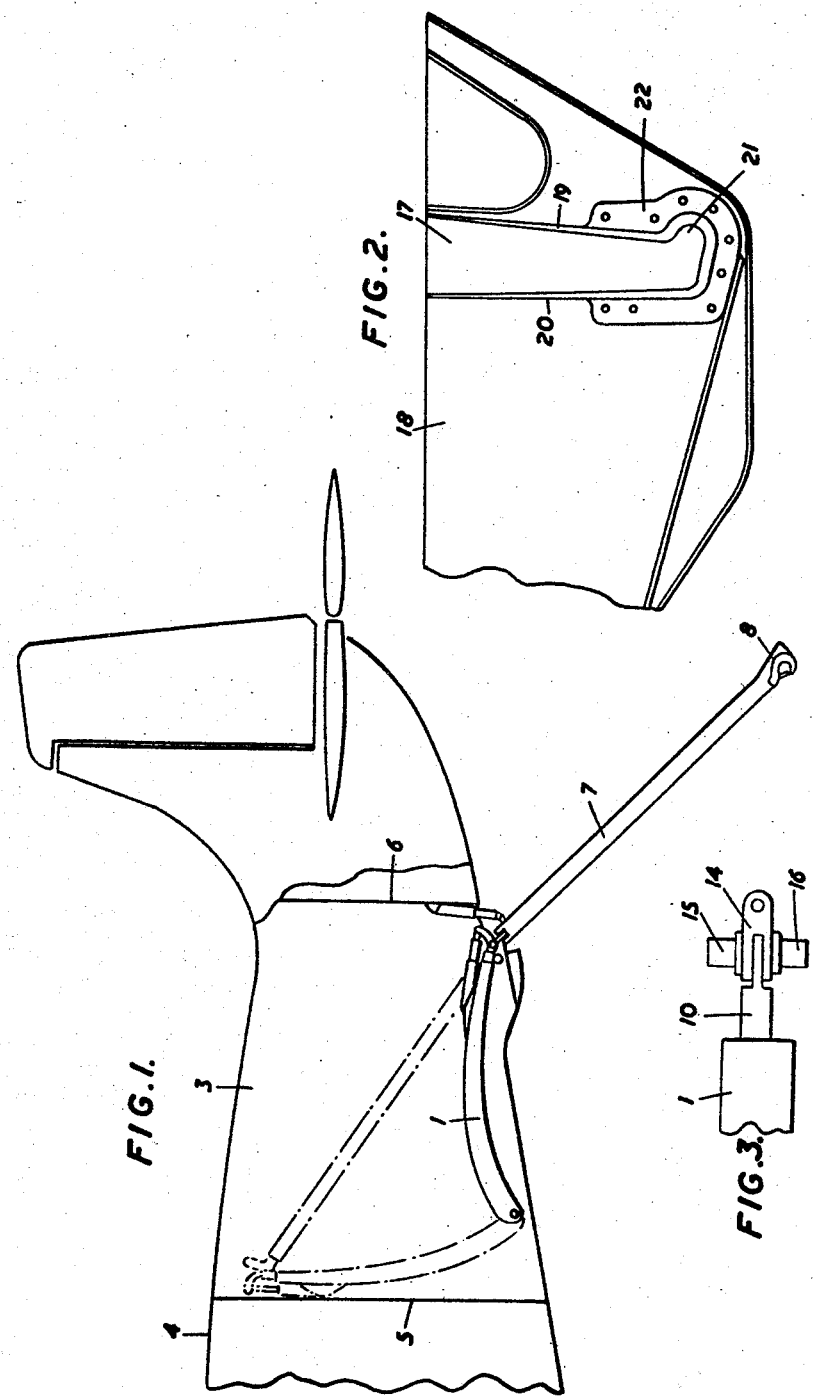
INVENTOR
GEORGE EDWARD PETTY
BY Otto Munk
HIS ATTY

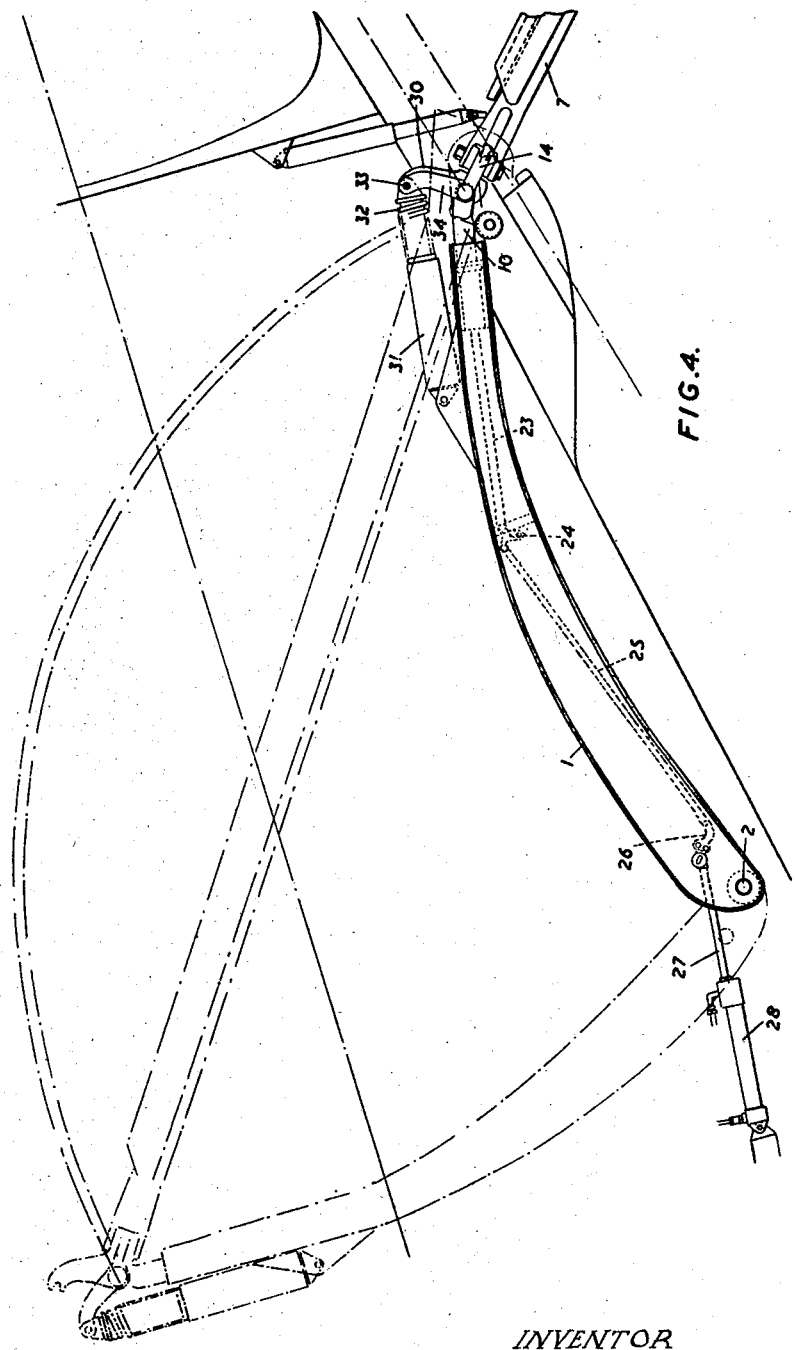

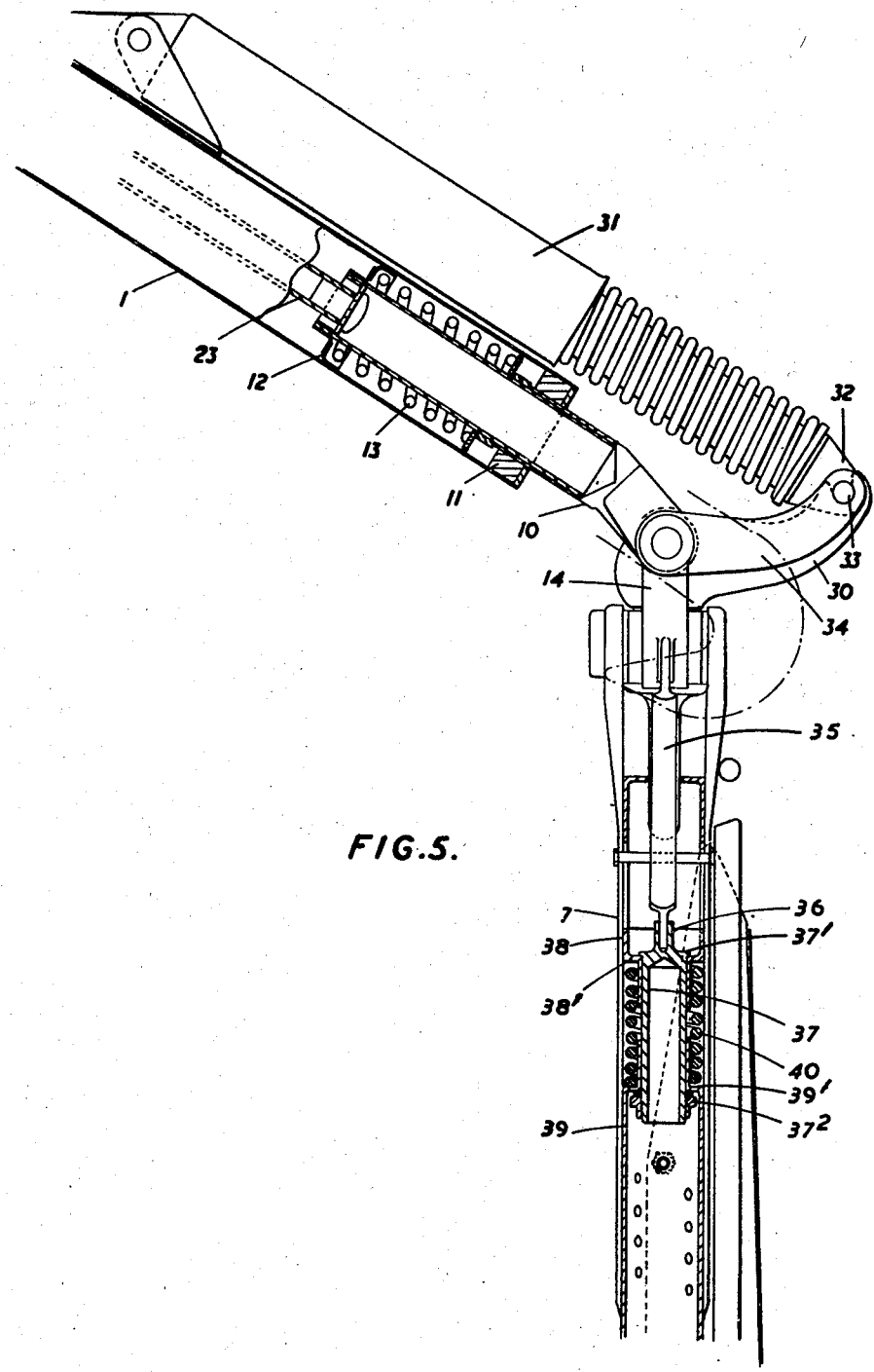

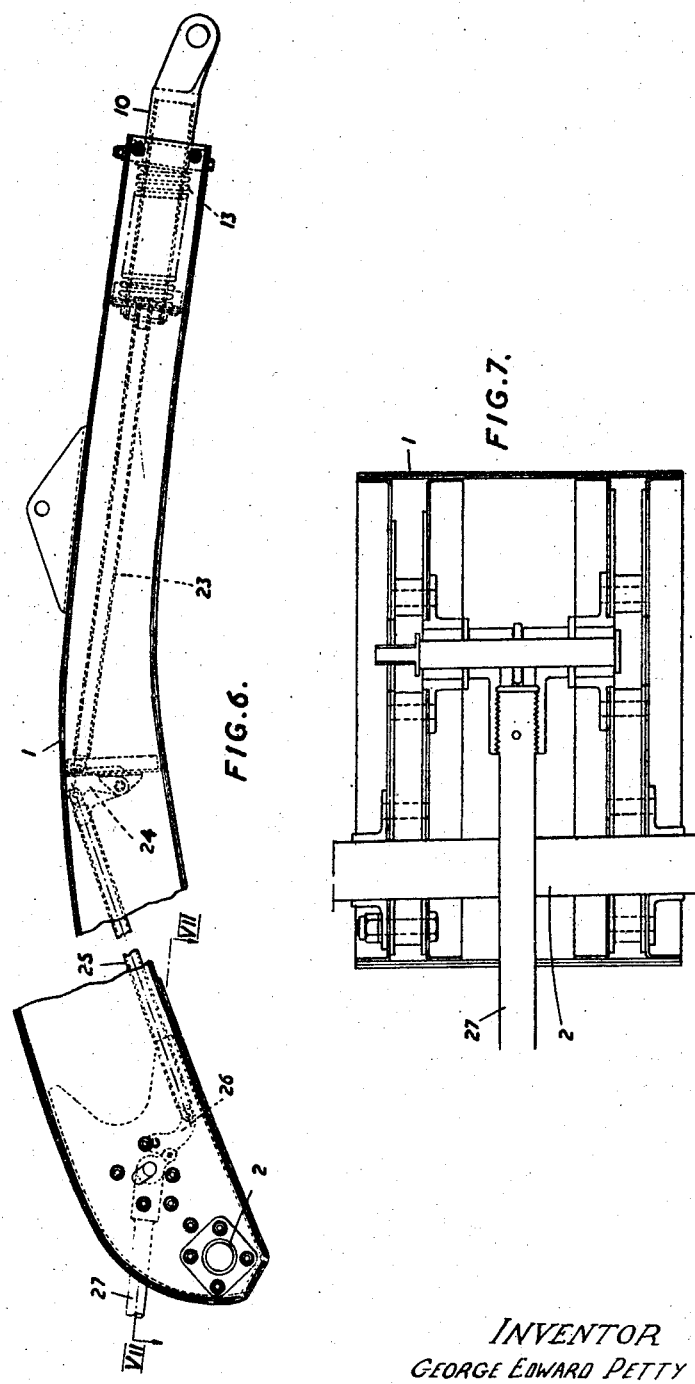

Patented Apr. 25, 1950

2,505,064

UNITED STATES PATENT OFFICE 2,505,064

RETRACTABLE ARRESTER GEAR FOR AIRCRAFT

George Edward Petty, West Leys, Swanland, England, assignor to Blackburn and General Aircraft Limited, a corporation of Great Britain Application February 18, 1948, Serial No. 9,083
In Great Britain January 7, 1947

4 Claims. (Cl. 244—110)

This invention relates to arrester gear for aircraft of the kind comprising a hook at the end of a free swinging arm located rearwardly of the main landing wheels and intended during landing of the aircraft to engage an arresting cable raised a short distance above the landing ground, for example, the deck of an aircraft carrier.

Hitherto it has been most usual to carry such arrester hook externally of the aircraft so that when stowed it lies along the undersurface of the fuselage from which it is released to swing down into operative position. It has, however, also been proposed to make the arrester hook retractable in which case it is drawn up into the fuselage and brought into stowed condition with the aid of guideways. Whilst such an arrangement is entirely satisfactory for practical purposes, the guideways need to be fairly strong and add unnecessary weight to the aircraft.

Now the principal object of the present invention is to provide a simple and light construction of retractable arrester gear.

A further object of the present invention is to provide for transmitting the arresting loads from the hook arm to the aircraft fuselage so that the hook arm retraction means are virtually unstressed under arresting conditions.

A still further object of the invention is to provide for locking the retraction means in hook arm operative position.

Still another object of the invention is to provide means for damping the movement of the hook arm with respect to its retraction means to tend to resist swinging movement of the arm about its horizontal axis should the hook bounce on the ground or landing deck and to speed up the return of the hook arm after a bounce.

The foregoing and other objects of the present invention will be apparent from the following description of a preferred embodiment of retractable arrester gear.

In the accompanying drawings:

Figure 1 is a side elevation of the rear end of an aircraft fuselage with part of the skin broken away to show the compartment provided to receive and the disposition of the arrester gear.

Figure 2 is a front view of one of the load taking brackets with which the retraction means of the arrester gear engage.

Figure 3 is a plan view looking down on the end of the retraction means showing the members which co-operate with the load taking brackets.

Figure 4 is a side elevation showing the retraction lever in full line in operative position and in chain line in its retracted position.

Figure 5 is a side elevation on enlarged scale of the end of the retraction lever and hook arm with parts shown in section.

Figure 6 is a side elevation showing the retraction lever already illustrated in Figure 4 on a somewhat larger scale to make clear the details thereof.

Figure 7 is a section on the line VII—VII of Figure 6 showing the pivot of the retraction lever and the engagement of the actuating means with that lever.

Referring now to the said drawings and in particular for Figure 1 thereof, the retraction means principally comprise a lever 1 pivoted on a transverse axis 2 and contained within a compartment 3 of an aircraft fuselage 4, and desirably a compartment which is bounded by bulk heads 5, 6 to form a water-tight compartment in order to prevent serious flooding of the fuselage should the aircraft come down on water. At the free end of the lever 1 is pivoted, for free swinging movement about axes at right angles to one another, an arrester hook arm 7 which terminates in a hook 8. Movement of the lever 1 in the one direction extends the arrester hook arm 7 into operative position and in the other direction retracts it within the fuselage by lengthwise movement thereof through an aperture in the fuselage. The arm 7 and hook 8 may be of conventional design but the new retraction mechanism is particularly useful with an arm and hook provided with means for ejecting the arresting cable after an arresting operation as described in the specification of co-pending patent application Serial No. 9,215, filed February 18, 1948, now Patent No. 2,479,927, based on British patent application No. 26,209 of 1947. The hook arm 7 is free swinging with degrees of freedom about "vertical" and horizontal axes and in order to prevent the arresting loads being transferred to the lever 1 the same is provided at its free end with lateral extensions 15, 16 which drop into brackets 18 fast on the fuselage and transmit the arresting loads thereto so that the lever 1 is virtually unstressed during arresting conditions.

In the preferred embodiment illustrated in the drawings, the lever 1 is a box lever of rectangular section hollow construction and carries at its free end an axially movable part 10 (see Figures 4 and 5) which telescopes with respect thereto, being supported by an end closure member 11 and transverse assembly 12, and is loaded by a spring 13 which tends to urge the part 10 outwardly to a controlled extent. The part 10 carries a member 14 for free angular movement with respect thereto about a horizontal axis and also laterally extending members 15, 16 each of which is intended to engage in a slot 17 with straight line sides in a bracket 18 made fast to the fuselage. One wall 19 of the slot 17 inclines towards the other wall 20 and terminates in an undercut portion 21 so that the slot 17 is similar to the slot of a bayonet joint. The walls of the slot are desirably thickened in the region of the undercut portion 21 and this portion of the bracket may be further strengthened by an additional plate 22. With this arrangement, as the laterally extending member 15 enters the slot 17 it rides down therein in contact with the wall 19 and causes axial displacement of the part 10 against the influence of its loading spring 13 which, when the member 15 reaches the bottom of the slot, forces the same into undercut portion 21 to lock therein and prevents retraction of the lever 1.

The inner end of the part 10 is connected as by a tube 23, lever 24, tube 25 and lever 26, all conveniently contained within the hollow construction of the lever 1, to the piston rod 27 of a hydraulic jack 28. The piston rod 27 is also connected through a lost motion connection (see Figure 6) to the retraction lever 1 such that on actuating the jack 28 to retract its piston rod a pull is first exerted on the tubes 23, 25 and levers 24, 26, which pulls back the member 10 to release the lateral members 15, 16 from their engagement in the undercut portions 21 of the slots 17 of the brackets 18 to permit upward swinging movement of retraction lever 1 after taking up of the lost motion connection of the piston rod 27 with respect thereto on further movement of such piston rod.

The hydraulic jack 28 is conveniently a double acting jack to move the retraction lever 1 into and out of operative position but in the event of power failure the lever will drop into operative position by gravity. An equivalent device such as an electric actuator of known construction may be used instead of a hydraulic jack.

In order to damp the movement of the hook arm 7 about its horizontal axis, an off set arm 30 is provided fast with the member 14 and on the end of the retraction lever 1 is mounted a spring loaded device 31 having at the end of its movable part 32 a transversely extending element 33 which engages in a recess provided in the arm 30. Desirably the spring loaded device 31 is pivoted to the lever 1, substantially as illustrated, when its movable part 32 is connected by links 34 which are connected to the part 10 conveniently on the transverse axis of the member 14. This arrangement is such that with the lever 1 in operative position with the hook arm 7 extended, the spring loaded device 31 is effective on the arm 30 to tend to urge the member 14 carrying the hook arm 7 into its one limit position about its horizontal axis of movement and so resist any tendency for the hook arm 7 to swing about that axis as, for example, on the hook 8 contacting the ground or landing deck and to accelerate the return thereof after a bounce. During retraction of the lever 1 the arm 30 separates from its engagement with the element 33 as may be seen from Figure 4 in the alternative position of the part shown in chain line but the spring loaded device 31 has its movable part kept in operative position by reason of the links 34 ready to re-engage the arm 30 when the parts again assume operative position. Instead of the spring loaded device 31, there may be used a hydraulic ram, an oleo pneumatic device, or other resilient device having a movable part.

The hook arm 7 is also desirably damped against angular displacement from its normally central position about its "vertical" axis, when the member 14 to which the hook arm 7 is pivoted for movement about such "vertical" axis has pivoted to it at a point eccentric to such axis one end of a link 35, which is desirably so constructed that its length may be adjusted and which extends in through a slot in the wall of the hook arm 7 to engage pivotally at 36 with a part 37 which is slidably disposed within the hook arm 7. The part 37 is operatively associated with piston-like members 38, 39 each constrained against movement away from one another and having a compression spring 40 therebetween. The shoulder $37^1$ of the part 37 by engaging the reduced diameter portion $38^1$ of the piston-like member 38 causes that piston-like member to follow the movement of the part 37 when the same is displaced, downwardly as seen in the drawings, against the action of the spring 40 when the opposite end of the part 37 moves idly with respect to the piston-like member 39. A collar $37^2$ fast on the end of the part 37 by engaging the reduced diameter portion $39^1$ of the piston-like member 39 causes the latter to follow the movement of the part 37, upwardly as seen in the drawings, against the action of the spring 40 when the upper end of the part 37 moves idly with respect to the piston-like member 38. Thus movement of the one piston-like member on movement of the part 37 in one direction compresses the spring in the one sense whilst opposite movement of the part 37 with consequent movement of the other piston-like member compresses the spring 40 in the opposite sense. The effect of this compression of the spring is to tend to return the displaced piston-like member to its original position with consequent movement of the part 37 and hence tends to restore the hook arm 7 to its central position since a displacement of the hook arm 7 about its "vertical" pivot virtually alters the length of the link 35 due to its eccentric point of pivoting with respect to the pivotal axis of the hook arm.

The construction of the lever 1 obviates the necessity of providing guide means as there will be little or no tendency for the retraction lever 1 and hook arm 7 to sway when retracted in which position the hook 8 is located in the aperture in the fuselage through which its arm 7 moves during extension and retraction, when the hook 8 may enter a fairing 35 which may be of robust construction to serve as a "bumper" for emergency use, for example, for an aircraft having a tricycle landing gear.

I claim:

1. Arrester gear for aircraft, including a pivoted lever entirely within the fuselage, a spring loaded axially displaceable part at the free end of said lever, a hook arm freely pivoted to said part and extending through an aperture in the fuselage, brackets mounted on said fuselage, elements on said spring loaded part for making latching engagement with said brackets, and power-operated means engaging said pivoted lever to swing it between alternative positions in one of which said hook arm is extended and in the other of which it is retracted by a lengthwise movement through the aperture in the fuselage.

2. Arrester gear for aircraft including a pivoted lever within the aircraft fuselage, an arm freely pivoted to the end of said lever and extending through an aperture in said fuselage, a hook arranged on the free end of said arm, means connected to said lever for engaging means on said arm to damp movement of said arm about its axis, load transmitting brackets mounted on said fuselage, elements on said lever for engaging said brackets when said arm is extended into operative position, and means for swinging said lever from a position in which said arm is extended to a position in which it is retracted within the fuselage by a lengthwise movement through the aperture in the fuselage.

3. Arrester gear for aircraft including a pivoted lever entirely within the aircraft fuselage, an arm pivoted to the end of said lever to extend through an aperture in said fuselage for free swinging movement about axes at right angles to one another, a hook on the free end of said arm, resilient means on said lever for engaging means on said arm to damp movement of said arm about one of its pivotal axes, means for damping movement of said arm about its other pivotal axis, load transmitting brackets mounted on said fuselage, projecting elements on said lever for engaging between said brackets when said arm is extended into operative position, and power-operated means connected to said lever for swinging it from a position in which said arm is extended to a position in which it is retracted within said fuselage by lengthwise movement thereof through said aperture in said fuselage.

4. Arrester gear for aircraft including a hollow lever pivoted within the aircraft fuselage, a spring loaded axially displaceable part at the free end of said hollow lever, an arm freely pivoted to said part to extend through an aperture in said fuselage for free swinging movement about axes at right angles to one another, a hook on the free end of said arm, resilient means on said lever for engaging means on said arm to damp movement of said arm about one of its pivotal axes, means for damping movement of said arm about its other pivotal axis, load transmitting brackets mounted on said fuselage, elements on said axially displaceable part for making latching engagement with said brackets when said arm is extended into operative position, means connected to said spring loaded part to displace it to disengage said latching engagement of said elements with said brackets, and power-operated means connected to said lever for swinging it from a position in which said arm is extended to a position in which it is retracted within said fuselage by a lengthwise movement thereof through the aperture in the fuselage.

GEORGE EDWARD PETTY.

REFERENCES CITED

The following references are of record in the file of this patent:

UNITED STATES PATENTS

| Number | Name | Date |
|---|---|---|
| 2,399,244 | Nicholson | Apr. 30, 1946 |
| 2,421,739 | Albright | June 10, 1947 |